United States Patent

[11] 3,592,187

| [72] | Inventors | Myron Youdin<br>Flushing;<br>Theobald Reich, New York, both of, N.Y. |
|---|---|---|
| [21] | Appl. No. | 854,989 |
| [22] | Filed | Sept. 3, 1969 |
| [45] | Patented | July 13, 1971 |
| [73] | Assignee | New York University<br>New York, N.Y. |

[54] BLOOD FLOW RATE - PRESSURE TRANSDUCER
5 Claims, 4 Drawing Figs.

[52] U.S. Cl.................................................. 128/2.05 E,
  73/194 E, 73/398 AR, 128/2.05 F
[51] Int. Cl.......................................... A61b 5/02
[50] Field of Search........................................ 128/2.05 E,
  2.05 F, 2.05 V, 2.05 N; 73/194 EM, 194 E, 398 AR

[56] References Cited
UNITED STATES PATENTS

| 3,184,966 | 5/1965 | Thornton et al. | 73/194 EM |
| 3,189,023 | 6/1965 | Salz et al. | 128/2.05 E |
| 3,225,859 | 12/1965 | Davidson | 73/398 AR |
| 3,239,696 | 3/1966 | Burkhalter et al. | 128/2.05 E |
| 3,240,207 | 3/1966 | Barker et al. | 128/2.05 E |
| 3,309,924 | 3/1967 | Kolin et al. | 73/194 EM |
| 3,389,362 | 6/1968 | McLellan | 73/398 AR |
| 3,403,672 | 10/1968 | Curtis | 128/2.05 F |

OTHER REFERENCES

MECHANICAL ENGINEERING, March, 1968, p. 53. (copy in GR 335, 128/2.05E)

*Primary Examiner* — Richard A. Gaudet
*Assistant Examiner* — Kyle L. Howell
*Attorney* — Kane, Dalsimer, Kane, Sullivan and Kurucz ABSTRACT: A blood flow and blood pressure transducer is provided including a core member having a fixed orifice lumen therethrough adapted to be coupled in line or about a blood vessel. Permanent magnets are coupled to the core forming a magnetic circuit, the force lines of which are perpendicular to the axis of the lumen. Two housings containing silver-silver chloride electrodes covered with permeable membranes are rigidly fastened to opposite sides of the core so that their electrodes extend into a gap in the magnetic circuit. The electrodes are aligned perpendicular to both the longitudinal axis of the lumen and the magnetic force lines. A third housing containing a silicon wafer strain gage is also coupled to the core member. A diaphragm formed of a very thin sheet of mica is provided at the interface of the housing and core lumen having one surface in contact with the strain gage and the other surface communicating with the core lumen.

INVENTORS
MYRON YOUDIN
THEOBALD REICH
BY
Kane, Dalsimer, Kane, Sullivan & Kurucz
ATTORNEYS

BLOOD FLOW RATE - PRESSURE TRANSDUCER

BACKGROUND OF THE INVENTION

There is a great need in physiology to measure accurately blood flow and blood pressure in unrestrained subjects over long periods of time. Present monitoring devices operate transcutaneously or require lead wires through the skin thereby introducing numerous complications and difficulties which impede successful monitoring of the subject's blood flow characteristics, especially when it is undesirable or impossible to immobilize the subject during the monitoring procedure.

It is, therefore a principal object of the present invention to provide an implantable flow rate-pressure transducer adapted to be implanted in the body of a subject under consideration and which may be used in conjunction with an implanted transmitter to telemeter signals indicative of the body's functions to a monitoring station. The transmitter, per se, does not comprise a part of the present application.

SUMMARY OF THE INVENTION

The aforementioned and other beneficial objects and advantages are attained in accordance with the present invention by providing a transducer comprising an elongated core member having a lumen of fixed, known diameter extending longitudinally therethrough. The core member serves as a support for flow rate and pressure sensors while the lumen provides a fixed flow meter orifice of known diameter and area. A magnetic circuit formed of one or more permanent magnet pieces disposed about the core is coupled to the core with the core extending through a gap in the magnetic circuit. The longitudinal axis of the core extends perpendicular to the magnetic flux lines. Two opposed housings are integral with the core and extend outwardly from the lumen. A silver-silver chloride electrode covered by a permeable membrane is provided within each housing aligned perpendicular to both the longitudinal axis of the core lumen and the magnetic flux lines. A third housing integral with the core and extending outwardly from the lumen is also provided. A monocrystalline piezoresistive element onto which is bonded a wheatstone bridge is contained within the housing. An impervious watertight diaphragm in the form of a mica window in substantial parallel alignment with the longitudinal axis of the core is provided at the interface of the lumen and housing, and the silicone wafer is bonded directly or indirectly to the housing and under the diaphragm Electrical lends extend from the sensors to the associated transmittal equipment.

The subject's blood flow rate is a function of the electrical voltage induced in the silver-silver chloride electrodes as a result of the flow of blood through the lumen cutting the magnetic lines of force. The subject's blood pressure is related to the stress applied to the mica diaphragm and is reflected in the electrical output of the piezoelectric crystal. Since the electrodes are fixed with respect to the core member, which in turn is fixed with respect to a blood vessel of the subject, the various outputs of the transducer will not be a effected by movement of the subject.

DETAILED DESCRIPTION OF THE PREFERRED EMBODIMENT

Figure 1:
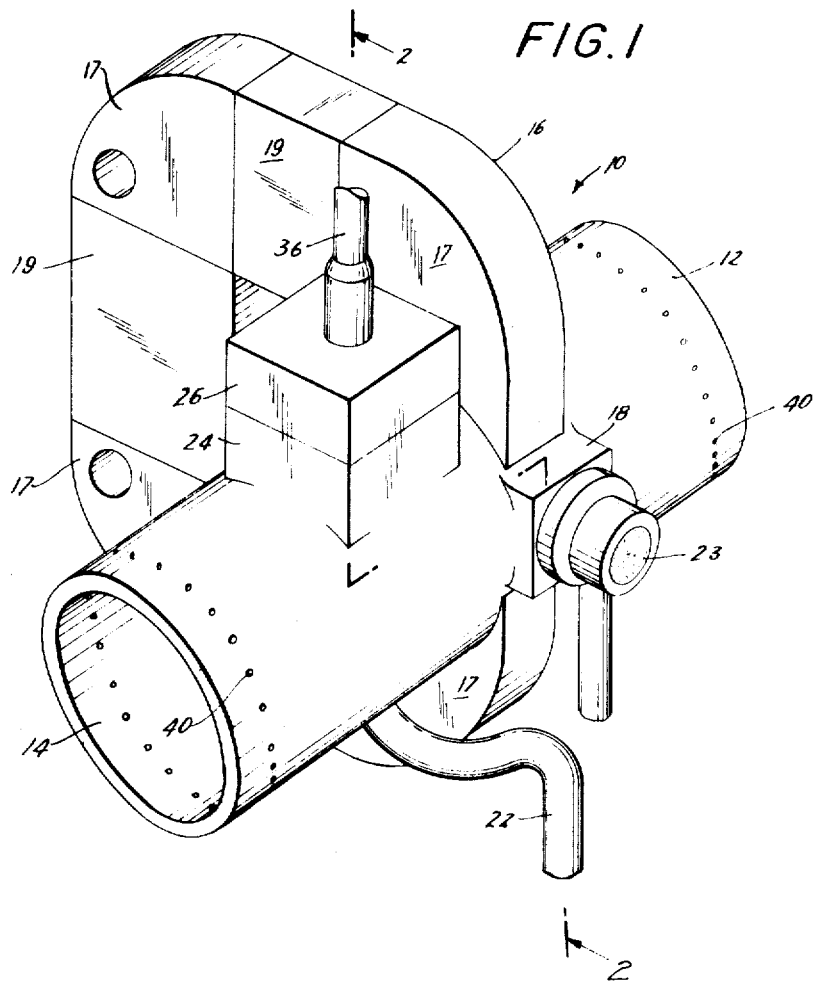
FIG. 1 is a perspective view of a transducer in accordance with the present invention prior to its encapsulation and coating with a material compatible with insertion within the body of a subject.

The present invention is illustrated in the accompanying drawings wherein similar components bear the same numerals throughout the several views. Reference is now made in particular to FIG. 1 wherein the transducer 10 of the present invention is shown prior to encapsulation, as comprising an elongated hollow core member 12 having a longitudinal lumen 14 of known fixed diameter extending therethrough. In actual use, the transducer will be completely encapsulated and coated with a material compatible with insertion within the body of a human or animal subject prior to implantation. A magnetic circuit 16 formed of one or more permanent magnetic pieces is disposed about the core member perpendicular to the longitudinal axis of lumen 14. In one successful practice of the present invention, the magnetic circuit included ingot iron corner pieces 17 epoxied to Alnico magnetic pieces 19. It should be realized, however, that a single permanent magnet could have been used as well.

Figure 2:
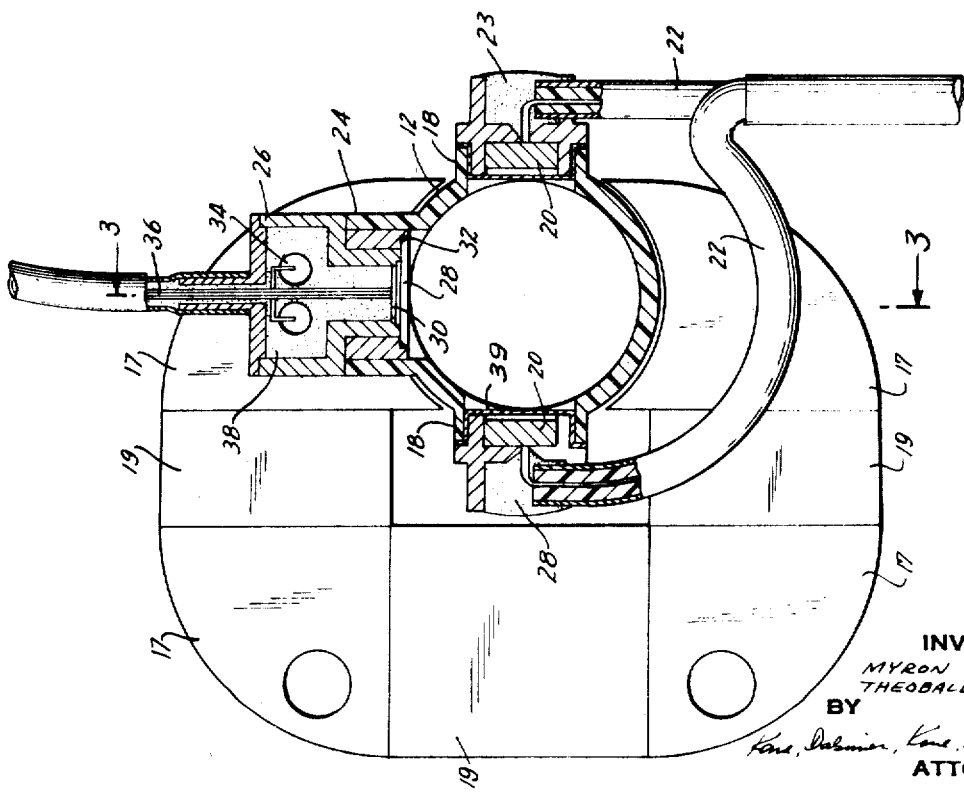
FIG. 2 is a side elevational view partly in section taken along reference lines 2-2 of FIG. 1 in the direction indicated by the arrows.

As seen most clearly in FIG. 2, two housings 18 disposed on opposite sides of core 12 are provided extending outwardly from the core lumen. A silver-silver chloride electrode 20 covered by a permeable membrane 39 is provided within each housing in perpendicular alignment with both the longitudinal axis of the lumen and the magnetic flux lines. To reduce turbulence and possible clotting in the area of the electrodes, each electrode is set back some distance from the housing-lumen interface. Affixed to each electrode is a lead 22 that is to be connected to the associated transmitter. The entire core is formed of Teflon or other suitable nonthrombogenic material, and may be lined with a nonthrombogenic coating or membrance of a material such as cellophane which membrance may be heparinized to reduce blood clotting. All voids in the housing 18 are filled with an encapsulating material such as a suitable epoxy 23.

Figure 4:
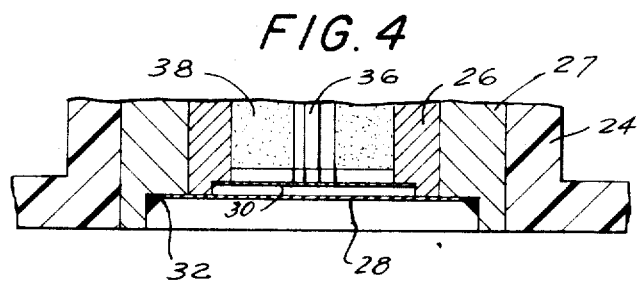
FIG. 4 is an enlarged fragmentary sectional view of portions of FIG. 3 illustrating the pressure sensor of the present transducer.
Figure 3:
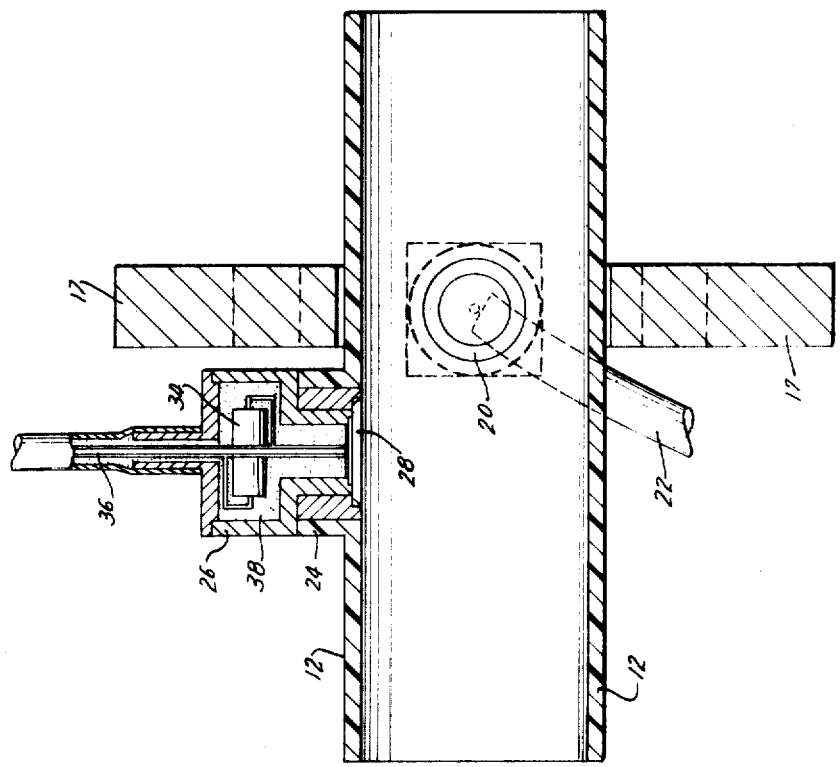
FIG. 3 is a sectional view taken along reference lines 3-3 of FIG. 2 in the direction indicated by the arrows.

A third housing 24 is also integral with the core member offset from housing 18. As seen in FIG. 4, an inner cup 26 is positioned in the housing sealed to the inner walls of outer cup 27 which in turn is sealed to the housing. Cup 26 should be formed of a metal whose linear coefficient of expansion reasonably matches that of the silicon wafer and in this connection, stainless steel, (invar) titanium and alloys thereof have been successfully used. Titanium is preferred for cup 26 since it has been found to be considerably less thrombogenic than stainless steel. An extremely thin mica crystal disc 28 on the order of 1 to 2 mg./cm.² thick is positioned across the open face of outer cup 27 (which is epoxied to cup 26) in line with the lumen of the core. The mica disc serves as a protective diaphragm for a piezoresistive element 30 which is bonded to the cup inside the diaphragm. To produce a liquid-tight and medically acceptable seal about the diaphragm which will not interfere with the pulsatile response of the diaphragm, a solder glass frit 32 having a linear coefficient of expansion substantially identical to that of the mica diaphragm and stainless steel or titanium cup (both of which have coefficients close to one another) is used to seal the diaphragm to the cup. The inner cup also contains wheatstone bridge elements bonded to the crystal using solid state diffusion techniques and temperature compensating resistors 34. The output of the wheatstone ridge is connected to the transmitter through a pair of leads 36 and electrical power is supplied to the bridge through another pair of leads 36. The remainder of cup 26 is filled with an encapsulating epoxy 38. Since the pressure sensor contained in housing 24 requires its own separate source of energy, it may be desirable to provide remotely activated switch means to turn the energy source ON and OFF, as required. In this manner, the energy source would only be drained during actual monitoring procedures. In a successful practice of the present invention, a mica window (28) approximately 1.4 mg./cm.² and a silicon wafer approximately 0.004±0.001 inches were utilized.

In operation, the core is positioned in line or about a blood vessel. Prior to such implantation, the entire transducer is coated with a suitable encapsulating material over which is added a coating such as medical silicon rubber compound that is compatible with insertion within a living subject. For in-line connections, the ends of the core may be provided with suitable holes 40 for direct suturing to the ends of a separated blood vessel or a conventional dacron or similar graft material may be affixed to the ends of the core for grafting to the ends of the blood vessel. For implantation about a blood vessel, the core must be initially split and thereafter reassembled clamped about the blood vessel. This removes the necessity for cutting the blood vessel. In the case of the split core, the magnetic circuit could serve to secure the sections of the split core to one another.

The flow rate sensors contained within housings 18 utilize the Faraday principle to measure the velocity of the blood flowing through the lumen. As a conductor moves through and cuts magnetic flux lines, a voltage will be induced in the conductor. In the present instance, the blood flowing through the core comprises the moving conductor which cuts through the flux lines produced in the gap of the magnetic circuit. This induced voltage is transmitted through the silver-silver chloride electrodes and leads to the transmitter and the level of the voltage is indicative of the rate at which lines of flux are cut, and hence the flow velocity of blood within the lumen. Since the lumen comprises a fixed flow orifice of known flow area, by integrating the blood flow over the orifice area, the flow rate may be determined. Blood pressure is determined from the unbalanced voltage output of the normally balanced wheatstone bridge contained in housing 24. The output of the wheatstone bridge is responsive to variations in the stress applied to the piezoresistive crystal through the diaphragm in response to pulsations in the blood flow.

Since both the flow rate and pressure sensors measure blood within the core and are permanently fixed with respect to the core, motion of the subject will not result in relative motion between the sensors and flow path (core). Hence, the output readings of the transducer are not affected by movement of the subject.

Thus, in accordance with the above, the aforementioned objectives are effectively attained.

Having thus described our invention what we claim is:

1. An implantable blood flow and pressure transducer comprising a magnetic circuit having an airgap therein, an elongated core member disposed within said airgap and having a lumen extending longitudinally therethrough perpendicular to the magnetic flux lines, first and second housings coupled to said core member on opposite sides of said lumen transverse to said lumen longitudinal axis and extending outwardly through said core from said lumen, first and second electrodes adapted to be electrically connected to an associated transmitter disposed within said first and second housings aligned perpendicular to both the longitudinal axis of said lumen and to the magnetic flux lines, a third housing coupled to said core member extending outwardly from said lumen perpendicular to the longitudinal axis of said lumen, diaphragm means extending across said housing-lumen interface, a piezoresistive element coupled to said diaphragm, and wheatstone bridge means integral or bonded to said piezoresistive element, the output of said wheatstone bridge being adapted to be connected to said transmitter and generate a signal responsive to the stress applied to said crystal.

2. The invention in accordance with claim 1 wherein said electrodes are set back within said housing from said housing-lumen interface and the walls of said core defining said lumen are lined with a thin membrane.

3. The invention in accordance with claim 1 wherein said magnetic circuit comprises permanent magnetic members.

4. The invention in accordance with claim 1 further comprising a metallic cup sealingly fitted within said third housing, said cup having an open end substantially in line with the housing lumen interface, and said diaphragm comprises a monocrystalline mica wafer extending across the open end of said metallic cup and is sealingly bonded thereto.

5. The invention in accordance with claim 1 wherein the ends of said core member include means thereon adapted for suturing said core member to a blood vessel.